United States Patent
Oransky et al.

(10) Patent No.: US 9,244,167 B1
(45) Date of Patent: Jan. 26, 2016

(54) LONG RANGE WEATHER INFORMATION DISPLAY SYSTEM AND METHOD

(71) Applicants: Alexander M. Oransky, Melbourne, FL (US); James D. Cahoon, Melbourne, FL (US)

(72) Inventors: Alexander M. Oransky, Melbourne, FL (US); James D. Cahoon, Melbourne, FL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 270 days.

(21) Appl. No.: 13/913,100

(22) Filed: Jun. 7, 2013

(51) Int. Cl.
*G01S 13/95* (2006.01)

(52) U.S. Cl.
CPC .................................. *G01S 13/953* (2013.01)

(58) Field of Classification Search
CPC ............ G01S 13/953; G01S 7/18; G01S 7/04
See application file for complete search history.

(56) References Cited

U.S. PATENT DOCUMENTS

| | | | |
|---|---|---|---|
| 650,275 A | 5/1900 | Reeve |
| 3,251,057 A | 5/1966 | Buehler et al. |
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |

(Continued)

FOREIGN PATENT DOCUMENTS

| EP | 1 329 738 B1 | 7/2003 |
|---|---|---|
| FR | 2658617 A1 | 8/1991 |

(Continued)

OTHER PUBLICATIONS

Advisory Action for U.S. Appl. No. 12/075,103, mail date Feb. 13, 2013, 3 pages.

(Continued)

*Primary Examiner* — Timothy A Brainard
(74) *Attorney, Agent, or Firm* — Angel Gerdzhikov; Donna Suchy; Daniel Barbieri

(57) ABSTRACT

A system and method of displaying weather data related to weather for an aircraft can include receiving onboard weather data and external weather data. A vertical weather profile is provided on a display based on the onboard weather data and the external weather data. Display includes a first portion associated with a first range closest to the aircraft and a second portion associated with a second range farthest from the aircraft. First images of weather in the first range are provided on the first portion in response to the onboard weather data and second images of the weather in the second range are provided on the second portion in response to the external weather data. Blended images can be provided on a blended portion between the first range and the second range.

20 Claims, 6 Drawing Sheets

(56) References Cited

U.S. PATENT DOCUMENTS

| | | |
|---|---|---|
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Thompson et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |

(56) References Cited

U.S. PATENT DOCUMENTS

| | | | |
|---|---|---|---|
| 7,372,394 | B1 | 5/2008 | Woodell et al. |
| 7,383,131 | B1 | 6/2008 | Wey et al. |
| 7,417,579 | B1 | 8/2008 | Woodell |
| 7,427,943 | B1 | 9/2008 | Kronfeld et al. |
| 7,471,995 | B1 | 12/2008 | Robinson |
| 7,486,219 | B1 | 2/2009 | Woodell et al. |
| 7,486,220 | B1 | 2/2009 | Kronfeld et al. |
| 7,492,304 | B1 | 2/2009 | Woodell et al. |
| 7,492,305 | B1 | 2/2009 | Woodell et al. |
| 7,515,087 | B1 | 4/2009 | Woodell et al. |
| 7,515,088 | B1 | 4/2009 | Woodell et al. |
| 7,528,613 | B1 | 5/2009 | Thompson et al. |
| 7,541,971 | B1 | 6/2009 | Woodell et al. |
| 7,557,735 | B1 | 7/2009 | Woodell et al. |
| 7,576,680 | B1 | 8/2009 | Woodell |
| 7,581,441 | B2 | 9/2009 | Barny et al. |
| 7,598,901 | B2 | 10/2009 | Tillotson et al. |
| 7,598,902 | B1 | 10/2009 | Woodell et al. |
| 7,633,428 | B1 | 12/2009 | McCusker et al. |
| 7,633,431 | B1 | 12/2009 | Wey et al. |
| 7,664,601 | B2 | 2/2010 | Daly, Jr. |
| 7,696,921 | B1 | 4/2010 | Finley et al. |
| 7,714,767 | B1 | 5/2010 | Kronfeld et al. |
| 7,728,758 | B2 | 6/2010 | Varadarajan et al. |
| 7,733,264 | B1 * | 6/2010 | Woodell et al. ............ 342/26 B |
| 7,859,448 | B1 | 12/2010 | Woodell et al. |
| 7,868,811 | B1 | 1/2011 | Woodell et al. |
| 7,917,255 | B1 | 3/2011 | Finley |
| 7,973,698 | B1 | 7/2011 | Woodell et al. |
| 7,982,658 | B2 | 7/2011 | Kauffman et al. |
| 8,022,859 | B2 * | 9/2011 | Bunch .................. G01S 13/953 342/26 A |
| 8,054,214 | B2 | 11/2011 | Bunch |
| 8,072,368 | B1 | 12/2011 | Woodell |
| 8,081,106 | B2 | 12/2011 | Yannone |
| 8,089,391 | B1 | 1/2012 | Woodell et al. |
| 8,111,186 | B2 | 2/2012 | Bunch et al. |
| 8,159,369 | B1 | 4/2012 | Koenigs et al. |
| 8,217,828 | B2 | 7/2012 | Kirk |
| 8,228,227 | B2 | 7/2012 | Bunch et al. |
| 8,902,100 | B1 | 12/2014 | Woodell et al. |
| 2002/0039072 | A1 | 4/2002 | Gremmert et al. |
| 2003/0001770 | A1 | 1/2003 | Cornell et al. |
| 2005/0049789 | A1 | 3/2005 | Kelly et al. |
| 2006/0036366 | A1 | 2/2006 | Kelly et al. |
| 2008/0158049 | A1 | 7/2008 | Southard et al. |
| 2009/0219197 | A1 | 9/2009 | Bunch |
| 2010/0019938 | A1 * | 1/2010 | Bunch .................. G01S 13/953 340/963 |
| 2010/0042275 | A1 | 2/2010 | Kirk |
| 2010/0194628 | A1 * | 8/2010 | Christianson ......... G01S 13/953 342/26 B |
| 2010/0201565 | A1 | 8/2010 | Khatwa |
| 2011/0148694 | A1 * | 6/2011 | Bunch et al. ................ 342/26 B |
| 2012/0139778 | A1 | 6/2012 | Bunch et al. |
| 2013/0234884 | A1 | 9/2013 | Bunch et al. |

FOREIGN PATENT DOCUMENTS

| | | |
|---|---|---|
| WO | WO-98/07047 A1 | 1/1900 |
| WO | WO-98/22834 | 5/1998 |
| WO | WO-03/005060 | 1/2003 |
| WO | WO-2009/137158 | 11/2009 |

OTHER PUBLICATIONS

Advisory Action for U.S. Appl. No. 12/075,103, mail date Nov. 8, 2010, 3 pages.

Advisory Action for U.S. Appl. No. 12/075,103, mail date Oct. 15, 2010, 3 pages.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), retrieved from www.ll.mit.edu/mission/aviation/faawxsystems/ciws.html, on Aug. 19, 2009, 3 pages.

Doviak et al., Doppler Radar and Weather Observations, 1984, 298 pages.

Dupree et al., FAA Tactical Weather Forecasting in the United States National Airspace, 29 pages.

Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.

Hodanish, Integration of Lightning Detection Systems in a Modernized National Weather Service Office, http://www.srh.noaa.gov/mlb/hoepub.html, retrieved on Aug. 6, 2007, 5 pages.

Honeywell, RDR-4B Forward Looking Windshear Detection/Weather Radar System User's Manual with Radar Operation Guidelines, Jul. 2003.

Keith, Transport Category Airplane Electronic Display Systems, Jul. 16, 1987, 34 pages.

Klingle-Wilson et al., Description of Corridor Integrated Weather System (CIWS) Weather Products, Aug. 1, 2005, 120 pages.

Kuntman et al, Turbulence Detection and Avoidance System, Flight Safety Foundation 53rd International Air Safety Seminar (IASS), Oct. 29, 2000.

Kuntman, Airborne System to Address Leading Cause of Injuries in Non-Fatal Airline Accidents, ICAO Journal, Mar. 2000.

Meteorological/KSC/L71557/Lighting Detection and Ranging (LDAR), Jan. 2002, 12 pages.

Nathanson, Fred E., "Radar and Its Composite Environment," Radar Design Principles, Signal Processing and the Environment, 1969, 5 pages, McGraw-Hill Book Company, New York et al.

Notice of Allowance for U.S. Appl. No. 10/631,253, mail date Jul. 28, 2005, 7 pages.

Notice of Allowance for U.S. Appl. No. 11/256,845, mail date May 27, 2009, 7 pages.

Notice of Allowance for U.S. Appl. No. 11/370,085, mail date Dec. 30, 2008, 6 pages.

Notice of Allowance for U.S. Appl. No. 11/402,434, mail date Nov. 4, 2008, 6 pages.

Notice of Allowance for U.S. Appl. No. 12/474,102, mail date Jan. 20, 2012, 6 pages.

Office Action for U.S. Appl. No. 11/256,845, mail date Aug. 21, 2007, 4 pages.

Office Action for U.S. Appl. No. 10/631,253, mail date Jan. 14, 2004, 5 pages.

Office Action for U.S. Appl. No. 10/631,253, mail date Jun. 30, 2004, 4 pages.

Office Action for U.S. Appl. No. 11/256,845, mail date Dec. 5, 2006, 5 pages.

Office Action for U.S. Appl. No. 11/256,845, mail date Jul. 28, 2008, 5 pages.

Office Action for U.S. Appl. No. 11/256,845, mail date Jun. 22, 2006, 5 pages.

Office Action for U.S. Appl. No. 11/370,085, mail date Aug. 15, 2007, 10 pages.

Office Action for U.S. Appl. No. 11/370,085, mail date Dec. 4, 2007, 13 pages.

Office Action for U.S. Appl. No. 11/370,085, mail date Oct. 9, 2008, 5 pages.

Office Action for U.S. Appl. No. 11/402,434, mail date Jul. 17, 2008, 5 pages.

Office Action for U.S. Appl. No. 11/402,434, mail date Mar. 29, 2007, 8 pages.

Office Action for U.S. Appl. No. 11/402,434, mail date Oct. 26, 2006, 7 pages.

Office Action for U.S. Appl. No. 11/402,434, mail date Sep. 20, 2007, 7 pages.

Office Action for U.S. Appl. No. 12/075,103, mail date Feb. 26, 2010, 11 pages.

Office Action for U.S. Appl. No. 12/075,103, mail date Jul. 29, 2010, 7 pages.

(56) References Cited

OTHER PUBLICATIONS

Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/474,102, mail date Sep. 7, 2011, 8 pages.
Office Action for U.S. Appl. No. 13/717,052, mail date Aug. 22, 2013, 15 pages.
Office Action on U.S. Appl. No. 12/075,103 Dated Jul. 31, 2013, 8 pages.
Pessi et al., On the Relationship Between Lightning and Convective Rainfall Over the Central Pacific Ocean, date unknown, 9 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
U.S. Appl. No. 14/206,239, filed Mar. 12, 2014, Rockwell Collins.
Decision on Appeal for Inter Parties Reexamination Control No. 95/001,860, dated Oct. 17, 2014, 17 pages.
Final Office Action on U.S. Appl. No. 12,892,663 dated Mar. 7, 2013, 13 pages.
Final Office Action on U.S. Appl. No. 13/238,606 Dated Apr. 1, 2014, 11 pages.
Final Office Action on U.S. Appl. No. 13/238,606 Dated Jan. 22, 2015, 6 pages.
Final Office Action on U.S. Appl. No. 13/246,769 Dated Sep. 16, 2014, 18 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Sep. 23, 2013, 15 pages.
Non-Final Office Action on U.S. Appl. No. 13/717,052 Dated Feb. 11, 2015, 15 pages.
Non-Final Office Action on U.S. Appl. No. 13/717,052 Dated Sep. 9, 2014, 8 pages.
Notice of Allowance on U.S. Appl. No. 12/075,103 Dated Aug. 4, 2014, 10 pages.
Notice of Allowance on U.S. Appl. No. 13/246,769 Dated Jan. 8, 2015, 10 pages.
Notice of Allowance on U.S. Appl. No. 13/707,438 Dated Feb. 25, 2015, 11 pages.
Office Action for U.S. Appl. No. 12/892,663, mail date Oct. 22, 2012, 12 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Greene et al., Vertically Integrated Liquid Water-A New Analysis Tool, Monthly Weather Review, Jul. 1972, 5 pages.
Kuntman, Satellite Imagery: Predicting Aviation Weather Hazards, ICAO Journal, Mar. 2000, 4 pages.
Office Action on U.S. Appl. No. 12/075,103 Dated Apr. 9, 2014, 5 pages.
Office Action on U.S. Appl. No. 13/246,769 Dated Apr. 21, 2014, 18 pages.
Office Action on U.S. Appl. No. 13/717,052 Dated Dec. 23, 2013, 7 pages.
RDR-4B Honeywell User Manual for Forward Looking Windshear Detection/Weather Radar System, Rev. 6, Jul. 2003, 106 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
US Office Action on U.S. Appl. No. 13/717,052 Dated Mar. 27, 2014, 6 pages.

\* cited by examiner

LONG RANGE WEATHER INFORMATION DISPLAY SYSTEM AND METHOD

CROSS REFERENCE TO RELATED APPLICATIONS

The present application is related to U.S. application Ser. No. 13/707,438, filed Dec. 6, 2012 by Fersdahl, et al., U.S. application Ser. No. 12/075,103, filed Mar. 7, 2008 by Woodell, et al., and U.S. application Ser. No. 13/717,052, filed Dec. 17, 2012 by Woodell, et al., all assigned to the assignee of the present application and all incorporated herein by reference in their entireties.

BACKGROUND

The present disclosure relates generally to the field of weather display systems. More particularly, the present disclosure relates to a weather display system having a vertical weather profile display.

Weather display systems are often used to alert operators of vehicles, such as aircraft pilots, of weather hazards in the area near the vehicle. Conventional weather display systems are configured to display images of weather in two dimensions. A horizontal plan view provides an overview of weather patterns near an aircraft mapped onto a horizontal plane. Such a horizontal plan view does not provide the pilot with information about how displayed weather cells vary with altitude (e.g., the differences in severity at different altitudes). A vertical view can provide a vertical weather profile which illustrates a slice of one or more weather cells along a plane for a particular set of ranges and altitudes.

Avionic weather radar systems have displayed weather images along with terrain information on a vertical situational display. These systems display the weather image limited to a range of approximately 100 nautical miles (NM). The 100 nautical mile range limitation is imposed by the resolution of onboard weather radar systems. However, current vertical situational displays are capable of displaying terrain and flight plan information to a range of approximately 1000 nautical miles. When ranges greater than 100 nautical miles are selected on the display, the vertical weather profile on the vertical situational display is cut off using a vertical line and the rest of the weather is blanked or grayed out. This solution does not provide an indication of weather beyond the 100 nautical mile range.

Thus, there is a need for a weather radar system that can provide a vertical situational display including weather images at ranges greater than 100 nautical miles. Further, there is a need for a weather radar system capable of utilizing data associated with ranges greater than 100 nautical miles and displaying images of weather data at such ranges in a vertical view. Further still, there is a need for a long range vertical weather situational display. There is also a need for a weather information display that provides more information than a conventional display with a horizontal profile and a vertical profile. There is also a need for a weather display system configured to display weather information generated based on radar returns from an onboard weather radar system and weather data from an external source.

SUMMARY

An exemplary embodiment relates to a system or a method of displaying weather data related to weather for an aircraft. One exemplary embodiment relates to a method comprising receiving onboard weather data derived from radar returns of a weather radar system of the aircraft, and receiving external weather data from an external source. The external source is remote from the aircraft. The method also includes providing a vertical weather profile of the weather on a display based on the onboard weather data and the external weather data from the external source. The display includes a first portion associated with a first range closest to the aircraft, a second portion associated with a second range, and a third portion associated with a third range farthest from the aircraft. The second range is between the first range and the third range. First images of the weather in the first range are provided on the first portion in response to the onboard weather data. Third images of the weather in the third range are provided on the third portion in response to the external weather data. Second images of the weather in the second range are provided on the second portion in response to the onboard weather data and the external weather data.

Another exemplary embodiment relates to an avionic weather system. The avionic weather system includes an electronic processor configured to provide a three-dimensional weather profile of weather near an aircraft based on first reflectivity data from radar returns of a weather radar system of the aircraft and the second reflectivity data from an external source. The electronic processor is also configured to provide a two-dimensional vertical weather profile on a display based on the first reflectivity data from the radar returns of the weather radar system of the aircraft and the second reflectivity data from the external source. The display includes a first portion associated with a first range closest to the aircraft and a second portion associated with a second range farthest from the aircraft. First images of weather in the first range are provided on the first portion in response to the onboard weather data. Second images of the weather in the second range are provided on the second portion in response to the external weather data.

Another exemplary embodiment relates to one or more computer-readable non-transitory storage media having instructions stored thereon. The instructions are executable by one or more processors to execute a method including receiving onboard weather data derived from radar returns of a weather radar system of the aircraft, receiving external weather data from an external source, and providing a vertical weather profile of the weather on a display. The external source is remote from the aircraft. The vertical weather profile is based on the onboard weather data and the external weather data from the external source. The display includes a first portion associated with the first range closest to the aircraft, and a second portion associated with a second range farthest from the aircraft. First images of the weather in the first range are provided on the first portion in response to the onboard weather data. Second images of the weather in the second range are provided on the second portion in response to the external weather data.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of control devices for various types of applications or analyzed systems.

Referring generally to the figures, systems and methods for providing visual representations of weather in the vertical profile, such as weather cells in proximity to an aircraft or other vehicle, are provided. According to one embodiment, both weather radar data from onboard an aircraft and external data from off board the aircraft are utilized to provide weather images on a vertical situational display (VSD) to provide a more complete weather picture across a longer range. In one embodiment, a blended output of both weather radar and external weather data products are utilized. External weather products can include XM products such as, high resolution NEXRAD and echo top data that can be transformed into vertical profiles along the aircraft track or along a selected azimuth in one embodiment. Two graphical representations based upon respective onboard data and external data can be correlated and blended in a mid-range region to provide a seamless weather depiction. Advantageously, such blending gives the pilot the best viewpoint of weather on a vertical situational display as it includes both tactical short to middle range weather information from an onboard weather radar system that is updated at high speeds and a strategic long-range weather outlook in one embodiment.

Figure 1:
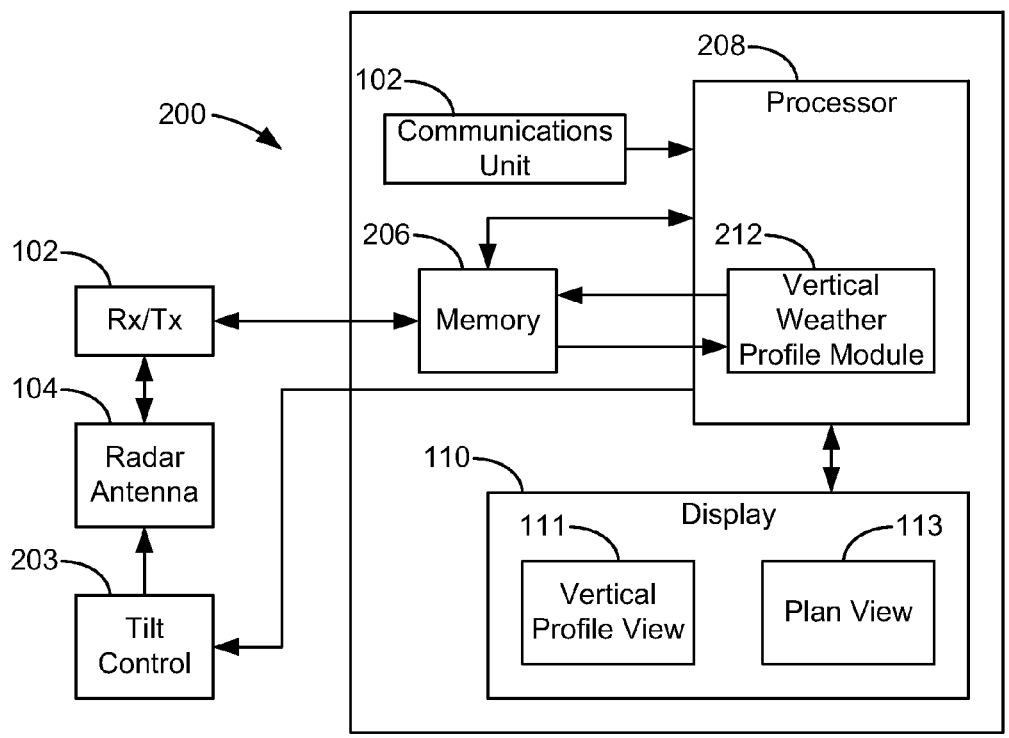
FIG. 1 is a general block diagram of a weather display system that may be used, for example, on an aircraft according to an exemplary embodiment.
Figure 2:
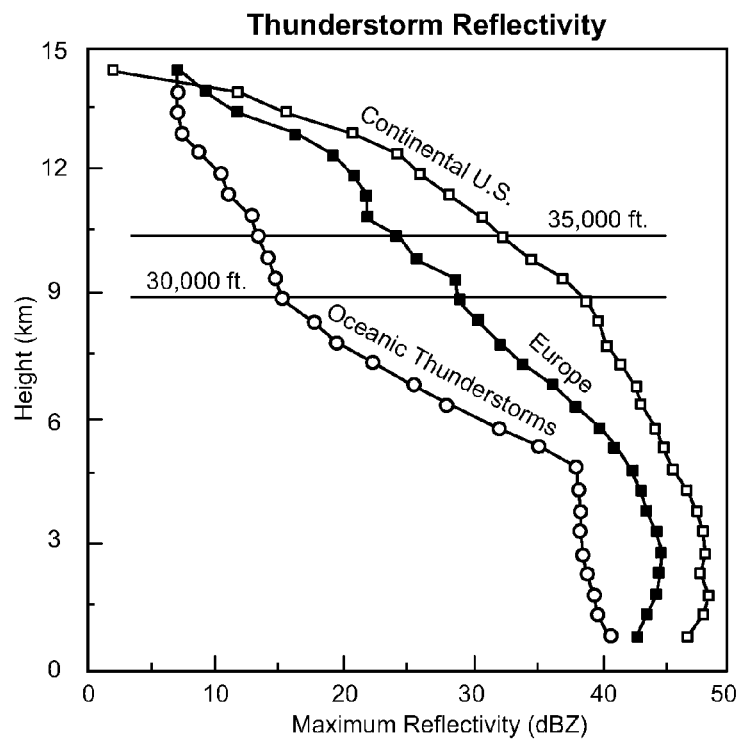
FIG. 2 is a graph showing typical convective cell reflectivity gradients as a function of geographical location.
Figure 3:
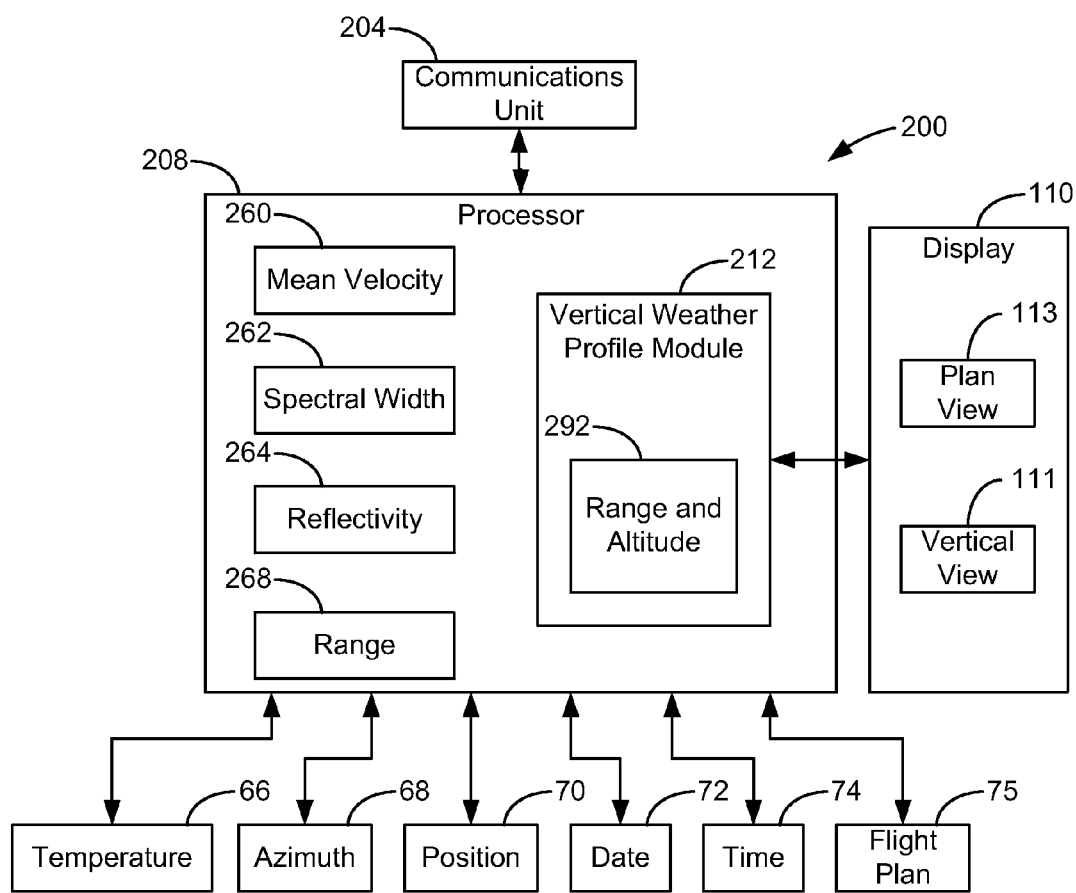
FIG. 3 is a more detailed block diagram of the weather display system illustrated in FIG. 1 according to another exemplary embodiment.
Figure 4:
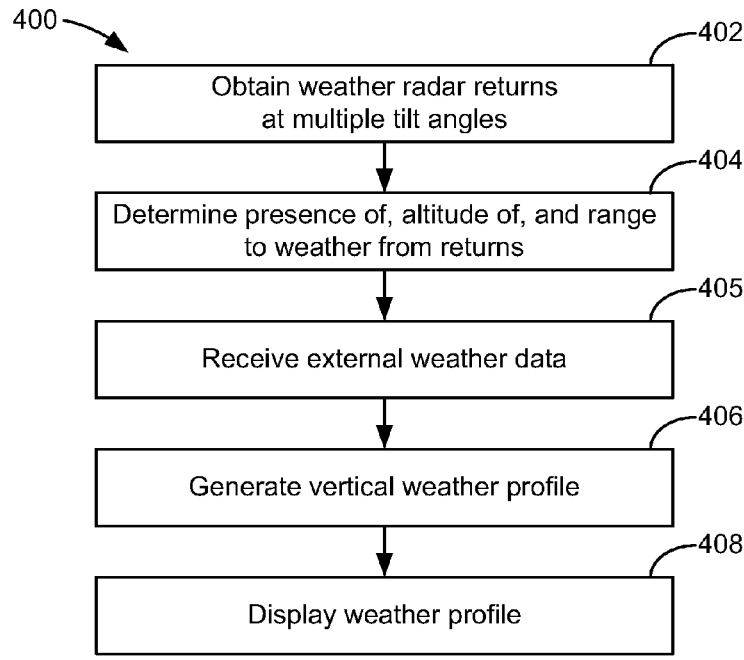
FIG. 4 is a flow diagram of a process for generating a vertical weather profile in the system illustrated in FIG. 1 using aircraft sensed weather data and weather data from a remote source according to an exemplary embodiment.

Referring generally to FIGS. 1 through 3, systems and methods that may be used to generate a weather model shown in a vertical profile view are shown and described according to exemplary embodiments. In some embodiments, a three-dimensional weather model may be constructed using systems and techniques described in U.S. Pat. No. 7,733,264, which is assigned to the assignee of the present application and is incorporated herein by reference in its entirety or any other references incorporated herein by reference.

Referring specifically to FIG. 1, a block diagram of an avionic weather display system 200 that may be used, for example, on a vehicle such as an aircraft is depicted according to an exemplary embodiment. In one embodiment, system 200 may be an avionics multi-scan system manufactured by Rockwell Collins, Inc., such as the RTA-4218 MultiScan or WXR-2100 weather radar system. System 200 includes a vertical weather profile module 212 (e.g., circuit, module, or routine). Vertical weather profile module 212 advantageously receives weather data from an internal source (e.g., a processor 208 or a memory 206 of the on board weather radar system) and an external source (e.g., via communications unit 204). Communications unit 204 can receive weather data from remote sources, such as, a NEXRAD weather data source. Unit 204 can be any communications unit suitable for use on a vehicle including VHF radios, Satcom radios, or other receivers.

Vertical weather profile module 212 may be used to create a spatially correct weather interpretation that may be displayed in the range, altitude, and time domains. A combination of horizontal and selected vertical antenna beams may facilitate the collection of radar return data (IQ data) that can be used to compute parameters to construct an accurate weather model. In addition, external data can be used to construct the weather model. In one embodiment, the external data is used to complete the weather mode at longer ranges (e.g., over 80 or 100 nautical miles). The weather model may be altitude-based, and an estimate of the reflectivity based on radar returns may be obtained for any scan angle, range, and altitude combination. Vertical weather profile module 212 may store the altitude-based weather model in a memory 206, and the weather model may be used to extract weather information in a defined manner (e.g., based on user actions).

Avionic weather display system 200 includes a weather radar receiver/transmitter 102, a weather radar adjustable antenna 104, a processor 208, and a memory 206 (e.g., a multi-scan, multi-tilt angle memory). System 200 also includes a tilt control 203 for automatically controlling the tilt angle (mechanical or electronic) of the antenna 104; this auto control may include an additional manual control feature as well.

Memory 206 may be capable of storing in a readily addressable and rapidly retrievable manner at least two data sets resulting from two or more antenna sweeps at different angles. Memory 206 can include any type of machine-readable storage device capable of storing radar returns or associated data for analysis/processing by processor 208. In some embodiments, memory 206 can store parameters of a weather model. The data in memory 206 can represent factors for a mathematical relationship defining reflectivity as a function of altitude in one embodiment. The data in memory 206 can be used by vertical weather profile module 212 to determine weather that should be displayed on display 110. Although a multi-scan, multi-tilt scanning and data sets are described, it should be understood by one of ordinary skill in the art that a single scan of data may also be used in some embodiments. Memory 206 can also be a three dimensional storage buffer for storing weather radar parameters according to X, Y and Z coordinates according to one embodiment. The storage of radar data and the form of the weather data stored therein is not disclosed in a limiting fashion. A variety of storage techniques for weather data can be used without departing from the scope of the invention. Memory 206 can store both external data from unit 204 and data from circuit 102. Processor 208 can correlate and merge external data and data from circuit 102 for storage in memory 206.

In some embodiments, the data may be stored as a mathematical equation representation of the information. The mathematical equation representation may be a piecewise linear function, piecewise nonlinear function, coefficients of a cubic spline, coefficients of a polynomial function, etc. that represent vertical representations of the weather based on the horizontal scan data and/or horizontal representation of the weather based on the vertical scan data. The function may be an equation based on weather parameters that may be sensor driven, model driven, a merger of sensor and model, etc. Although horizontal scan data is described, alternative embodiments may include X, Y Cartesian coordinates, rho/theta input, latitude and longitude coordinates, altitude, etc. Weather may be estimated for any required point in space with the vertical dimension being the subject of the weather equation.

Display 110 can be part of an avionic multi-function display (MFD) unit in one embodiment. In some embodiments, display 110 may be any of a variety of display types, such as a navigation display, an electronic flight bag, a tablet computing device, a synthetic vision system, a heads up display (HUD), a dedicated weather display, or another type of display system. In some embodiments, display 110 may be a remote display not included within a cockpit of the aircraft, such as a ground-based support display or remote display configured to display information regarding whether near an unmanned aerial vehicle (UAV). Processor 208 may be included as part of a multi-scan, multi-tilt angle weather radar system and may perform the customary functions performed by a conventional weather radar return processing unit. Processor 208 may also perform several additional operations based upon the additional data and/or instructions provided in memory 206. In general, processor 208 can merge or cross qualify portions, or ranges, of the radar returns of several different antenna sweeps at several different tilt angles, so that a single, relatively clutter-free image may be presented to the pilot based upon the several separate scans. The radar returns may be processed by processor 208 to generate a three-dimensional weather profile of the weather near the aircraft.

System 200 may perform a scanning operation by transmitting at least two beams at different tilt angles. In some embodiments, system 200 may use a global positioning system (GPS), terrain database, or other tool to control the tilt control 203. Data obtained from the radar returns (e.g., reflectivity data) may be stored in memory 206. For example, known ground clutter may be removed from each of the returns using ground clutter suppression techniques.

Convective weather has a vertical reflectivity gradient which extends from the ground to a point where the radar can no longer detect echoes from the weather. This gradient can have similar characteristics from weather cell to weather cell. A typical weather cell will have substantial, nearly constant reflectivity between the ground and the height at which the atmospheric moisture begins to freeze.

Above the freezing layer, the reflectivity falls off in a nearly linear manner until the storm generally tops out at the top of the troposphere. Referring now to FIG. 2, a graph 120 showing typical convective cell vertical reflectivity gradients as a function of geographical location is shown. Graph 120 represents convective cell vertical gradients as shown in Zipser, E. J. and Lutz, K. R., "The Vertical Profile of Radar Reflectivity of Convective Cells," American Meteorological Society, Volume 122, Issue 8, August 1994. Functions representative of these types of gradients may be generated and stored in memory 206 for various range and azimuth locations along a flight path. For example, such functions may be based on the slopes of the gradients at the different locations along the flight path. The gradients (e.g., slopes of the gradients) may vary according to factors such as geographic location, time of day, and/or time of year. In some embodiments, coefficients of the functions can be adjusted based on the received weather radar information. For example, some highly energetic weather cells may produce overshooting tops that intrude into the troposphere. The energy state of a cell may be estimated from the vertical gradient and dBz level aloft.

Referring again to FIG. 1, in some embodiments, processor 208 may be configured to store parametric characteristics of the vertical extent of the weather in memory 206 instead of detecting and storing the entire reflectivity profile in a traditional three-dimensional memory. For example, since the radar knows current altitude and outside air temperature, processor 208 can be configured to estimate the altitude of the local atmospheric freezing layer. Further, processor 208 can estimate the height of the troposphere based on latitude, season, or more precise FMS data. Using this information and radar elevation scan data collected from scanning processes (e.g., normal MultiScan two-tilt or three-tilt processes), processor 208 may generate a linear fit of the reflectivity data from the ground to the freezing layer and another linear fit between the freezing layer and top of the troposphere. Details associated with the vertical profile in this embodiment can include the ground height, freezing layer height, the troposphere height, the reflectivity level at ground level, the reflectivity level at freezing layer, and the reflectivity level at the troposphere top. This information is sufficient to generate a function which can generate vertical reflectivity at any altitude. In some embodiments, the reflectivity data may be generated at or near a time of rendering an image of the weather on display 110 by extrapolating the vertical weather data in real-time or near real-time. In some embodiments, the reflectivity data may be generated some amount of time in advance of rendering on display 110 and stored in memory 206.

Some embodiments may use more complex curve fits. Specific curve fits can be utilized depending on geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

This process allows a rapid assessment of vertical cell extent with a minimum of data. Rapid assessment may significantly increase the speed of such an assessment in turns or during initial radar power up.

Processor 208 may process weather radar returns to identify or sense the presence of weather in front of or in view of the aircraft. Vertical weather profile module 212 may utilize the altitude and the range to the weather to generate a vertical profile associated with the weather. Vertical weather profile module 212 may scan across an array of azimuths to generate a three-dimensional weather model of the weather near the aircraft, which may be stored for later presentation or immediately presented on display 110.

After vertical weather profile module 212 generates a three-dimensional weather model, processor 208 may transmit data to display 110 that causes display 110 to present a visual representation of the three-dimensional weather profile. In some embodiments, display 110 may be a two-dimensional display device and provide an image of the weather in a vertical profile screen 111 and/or horizontal plan screen 113 (e.g., separately or simultaneously).

Vertical weather profile module 212 can be implemented using hardware, software, or a combination thereof. In one embodiment, module 212 is a software routine that operates within processor 208. Although shown as part of processor 208, module 212 can be a separate circuit or be provided between display 110 and processor 208. According to one embodiment, module 212 can be implemented upon its own processor platform. In some embodiments, vertical weather profile module 212 determines the range and altitude associated with the sensed weather and weather derived from data provided by unit 204. The range and altitude may be used so that vertical weather profile module 212 can generate a vertical profile for the weather. One or more vertical profiles may be used to generate a vertical weather profile of weather in proximity to the aircraft for display on display 110.

With reference to FIG. 2, processor 208 of system 200 can receive additional parameters associated with the weather radar return data. The additional parameters can be utilized to improve the quality of the vertical weather prediction.

Processor 208 can provide a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 110. Processor 208 can also provide a temperature parameter 66, an azimuth 68, a position 70, a date 72, a flight plan 75 and time 74. Alternatively, a separate temperature sensor 66 can be coupled to processor 208. Parameters 260, 262, 264, and 268 can be computed by processor 208 using data stored in memory 206.

Processor 208 can use parameters 260, 262, 264, and 268 to determine hazards and use flight plan 75, azimuth 68. position 70, and time 74 to determine the proximity of the hazard to the flight plan or aircraft's movement. Parameters 260, 262, 264, and 268 can also be used to improve the quality of the vertical weather prediction. For example, if processor 208 determines that the weather includes a convective cell that is growing, that characteristic can be considered when determining the height and/or other characteristic of the weather as discussed above.

In some embodiments, processor 208 and/or module 212 may be implemented in software subroutines. The routines can be executed on one or more processors associated with system 200. In one embodiment, system 200 uses a hardware platform of a weather radar system manufactured by Rockwell Collins, Inc. However, the embodiments of the present disclosure are not limited to implementation on any particular type of hardware platform.

With reference to FIG. 3, a flowchart illustrates a process 400 in which processor 208 of system 200 provides signals, either directly to receiver/transmitter circuit 102 or indirectly through memory 206, to provide radar beams at radar antenna 104. In some embodiments, process 400 may be implemented using instructions stored on a non-transitory machine-readable medium (e.g., memory 206) and executed on a processor (e.g., processor 208). Processor 208 may be configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 (at a step 402). Receiver/transmitter circuit 102 can be a single path or can have separate circuits for a receive path and a transmit path. Processor 208 may determine power associated with the radar returns.

Processor 208 processes the weather radar returns to determine the presence of weather and the altitude and range of weather (e.g., based on reflectivity) at a step 404. In one embodiment, the altitude of weather can be determined by comparing power levels of radar returns at different tilt angles.

At a step 405, processor 208 receives weather data from an external source. The weather data can be received simultaneously or sequentially with step 404. The external weather data can be reflectivity data associated with a radar system remote or off board the aircraft. In one embodiment, the external data is NEXRAD weather data. The NEXRAD weather data can be high resolution NEXRAD weather data and can include echo top data. Processor 208 can transform the NEXRAD echo top data as well as the reflectivity data from step 404 into a weather profile for a vertical situational display.

Vertical weather profile module 212 generates a vertical weather profile at a given range and over a defined altitude at step 146. Vertical weather profile module 212 can generate a vertical profile for a given range and azimuth at an altitude or an altitude range for the weather. The resulting graphic provided by step 146 is preferably scaled to the size of the vertical situational display (e.g., view 111 of display 110). Generally, for the vertical situational display, a plane that includes the nose of the aircraft is selected based on a desired azimuth, heading, or flight plan.

The reflectivity data from step 404 is utilized to fill the vertical profile with weather images at shorter ranges while the weather data from step 405 is utilized to fill the profile with weather images at longer ranges. In one embodiment, data from step 404 is utilized at the 0.5 to 100 nautical mile range while data from step 145 is used at a range greater than 100 nautical miles. In one embodiment, data from step 404 is utilized at 0.5 to 80 nautical mile range, data from steps 404 and 405 are both used at the 80 to 120 nautical mile range, and data from step 405 is used at ranges more than 120 nautical miles.

In one embodiment, two graphical representations from each data source can be blended in a midrange region (e.g., region from 80 to 100 nautical miles) to provide a seamless weather depiction. In this way, data updated at a high speed is provided in short and middle ranges while strategic weather which is not updated as often is provide at longer ranges in one embodiment. For example, in one embodiment NEXRAD data is updated every five to fifteen minutes while echo top data is updated every 7.5 minutes. Applicants believe that this updated rate provides ample time to maintain a realistic vertical weather profile at ranges greater than 100 nautical miles in one embodiment. Once the weather profile is generated at a step 406, the profile is displayed at a step 408.

The pilot can select ranges via a user interface. For example, if the pilot selects ranges below 100 nautical miles, only data from the on-board weather radar is displayed according to one embodiment. When the pilot selects ranges greater than 100 nautical miles, blended regions and regions including data from only the external weather data are provided on display 110 at ranges greater than 100 nautical miles.

The azimuth angle from the aircraft for the vertical weather profile or the vertical situational display can be provided directly from a heading from azimuth 68 or a flight plan using flight plan input 75. Flight plan 75 can be provided by a flight computer or other navigation device. Alternatively, the azimuth angle can be chosen via the user interface.

Figure 5:
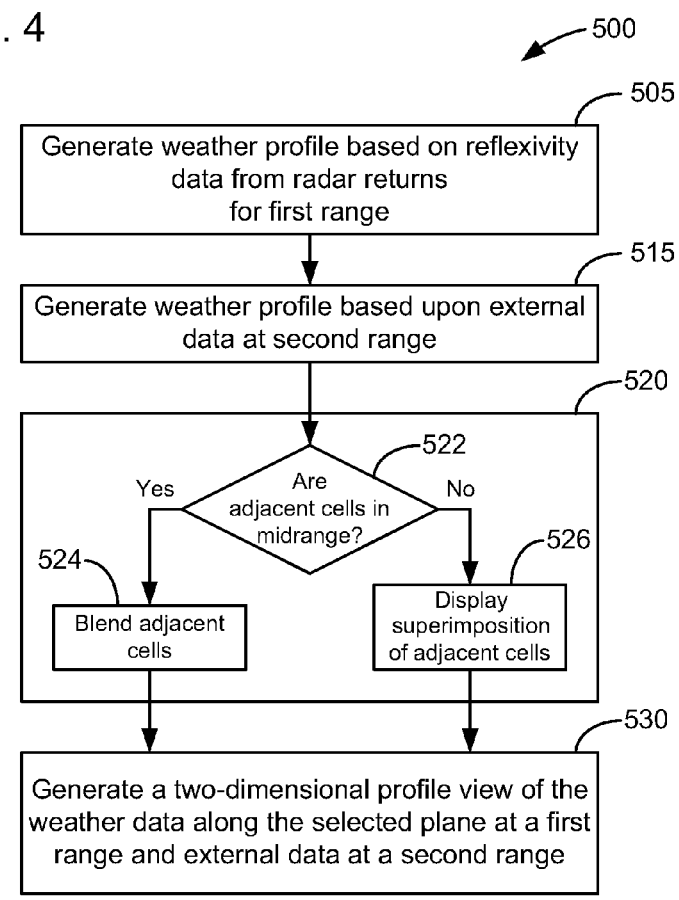
FIG. 5 is a more detailed flow diagram of a process for generating the vertical weather profile in the system illustrated in FIG. 1 including a blending operation according to another exemplary embodiment.

With reference to FIG. 5, a process 500 generates the image for the vertical situational display or vertical weather profile using a blending process. At a step 505, processor 208 generates a weather profile based on reflectivity data from radar returns for a first range. At a step 515, processor 208 generates a weather profile based on external data at a second range. The second range is greater than the first range. At a step 520, processor 208 blends images for the profiles in steps 505 and 515.

Step 520 can include a first step 522 where processor 208 determines if there are adjacent cells in a range between the first range and second range. Adjacent cells can be defined as cells being within a particular distance (e.g., within 40 nautical miles). If so, the adjacent cells are blended at a step 524. If not, the cells are superimposed with respect to each other at a step 526. After steps 524 and 526, processor 208 generates a two-dimensional profile of the weather along the selected plane at a step 430.

Blending at step 520 can be achieved by combining data and filling spaces between the data in one embodiment. An exemplary algorithm is set forth below:
1. If there are no adjacent weather cells (e.g., closer than 30, 40, or 50 nautical miles) from different sources (on-board weather radar and XM), output a superposition of two graphics.
2. If two weather cells from different sources are closer than a threshold (e.g., 30, 40, or 50 nautical miles), the cells are blended together using the following rules:
   a. Find maximum altitudes (tops) for each reflectivity level in both cells.
   b. Points of maximum altitudes (tops) of each reflectivity levels are connected.
   c. The space filled with the required color to represent the desired reflectivity level to blend the cells.

Alternatively, blending can take the average of the pixel values at each pixel location. In one embodiment, the averages can be weighted according to distance to the aircraft (e.g., on board data weighted more heavily at locations closer to the aircraft).

Figure 6:
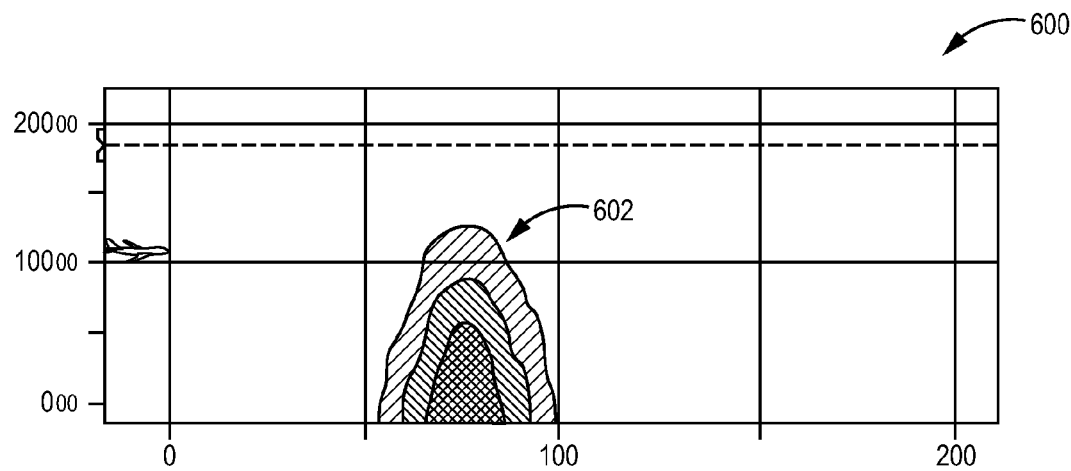
FIG. 6 is a depiction of vertical weather profile using aircraft sensed weather radar data.

With reference to FIG. 6, a vertical situation display 600 includes an image of weather 602 determined by data derived from returns received by weather antenna 104. Weather 602 is represented by colors signifying reflectivity in accordance with weather radar standards and correspond to precipitation rates in one embodiment. Weather at ranges more than 100 nautical miles are not displayed.

Figure 7:
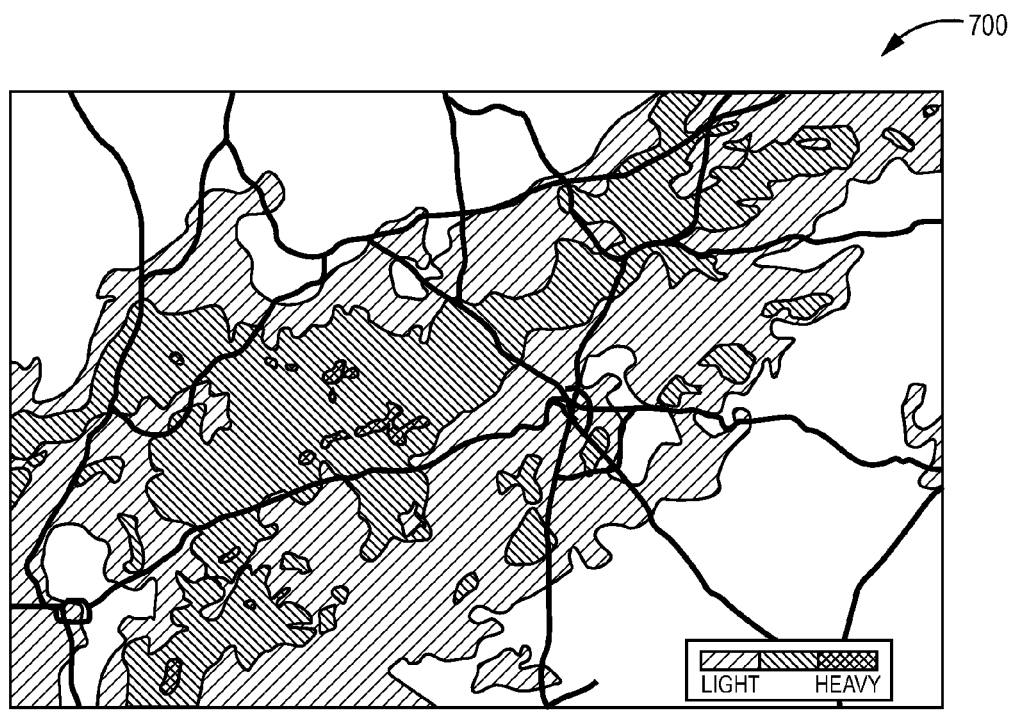
FIG. 7 is a top view depiction of weather from an external source at a location.
Figure 8:
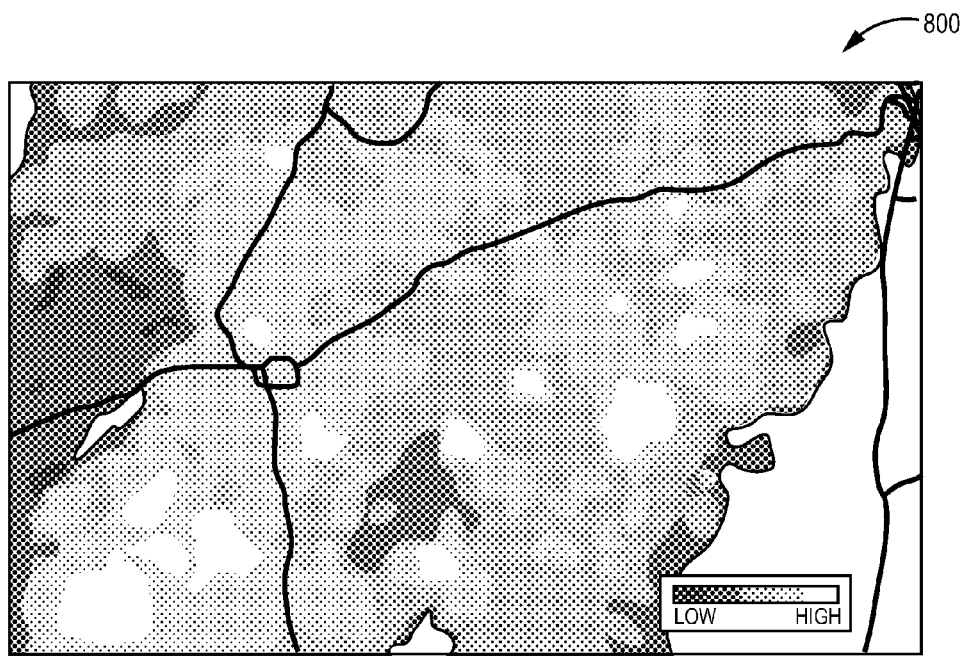
FIG. 8 is a top view depiction of echo tops associated with a portion of the weather illustrated in FIG. 7.

With reference to FIG. 7, weather data from an external source such as a high resolution NEXRAD is represented in an image of weather 700. Colors can represent the reflectivities associated with weather 700 and correspond to precipitation rates. With reference to FIG. 8, an image of weather 800 represents echo tops associated with some of weather 700 illustrated in FIG. 7. Color represents the altitude of a threshold reflectivity level (e.g., 18-30 dBz). Echo tops for other reflectivity levels can also be provided or calculated.

Weather 700 generally includes reflectivity level data applied to every pixel that represent a particular area (for example, one nautical mile by one nautical mile square). Echo tops of weather 800 can be applied at every pixel as well. This effectively creates a 3D model of weather using external data.

Updates for the data associated with images 700 and 800 are preferably provided every five to fifteen minutes. At cruise speeds of 500 knots, the aircraft travels 125 nautical miles in fifteen minutes. Applicants note that weather cells can form, mature, and decay as quickly as twenty minutes. Therefore, the use of weather data from sources with low speed updates may not be useful for weather avoidance at closer ranges during flight.

Figure 9:
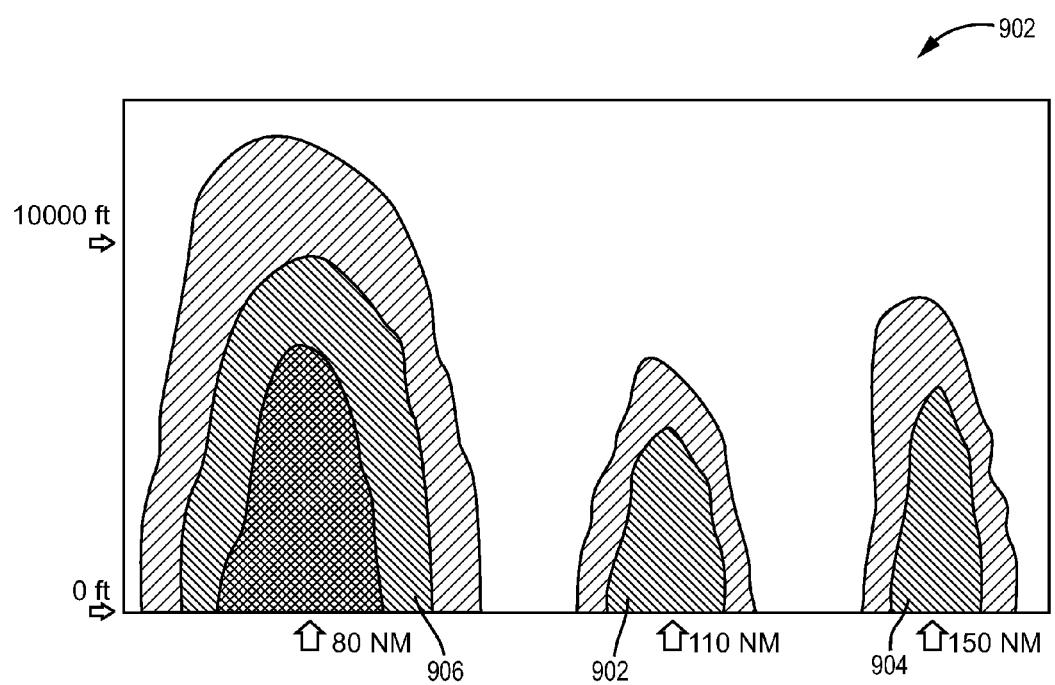
FIG. 9 is a depiction of a vertical weather profile for weather illustrated in FIGS. 6, 7, and 8.

With reference to FIG. 9, an image of weather 902 shows a vertical profile using the data for weather 602, 700, and 800 (FIGS. 6, 7, and 8). Weather 906 includes weather 602. Weather 902 and 904 are derived from the data for weather 700 and 800 in FIGS. 7 and 8.

With reference to FIG. 9, weather 902 is at approximately 110 nautical miles from the aircraft and weather 904 is at approximately 150 nautical miles from the aircraft. Weather 602 and 906 are approximately 80 nautical miles from the aircraft. Weather 906 and 902 are neighboring cells within a predetermined distance, such as 40 nautical miles, in one embodiment.

Figure 10:
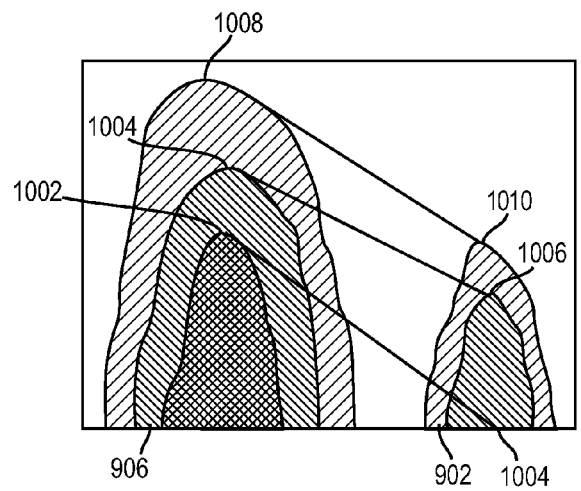
FIG. 10 is a depiction of a vertical weather profile for the weather illustrated in FIG. 9 at an intermediate range.

With reference to FIG. 10, processor 208 merges cells or weather 906 and 902 by determining the maximum altitudes associated with each reflectivity level. A maximum altitude 1002 in weather 906 for a first reflectivity level is connected to a zero altitude level 1004 in weather 902. A maximum altitude level 1004 in weather 906 for a second reflectivity level is connected to the maximum altitude level 1006 for the same reflectivity level in weather 902. A maximum altitude level 1008 in weather 906 for a third reflectivity level is connected to a maximum altitude level 1010 in weather 902 for the same reflectivity level. The zero altitude level 1004 is chosen because the reflectivity level associated with altitude level 1002 does not exist in weather 902. The first reflectivity level can be a red reflectivity level, the second reflectivity level can be a yellow reflectivity level and the third reflectivity level can be a green reflectivity level associated with weather radar systems.

Figure 11:
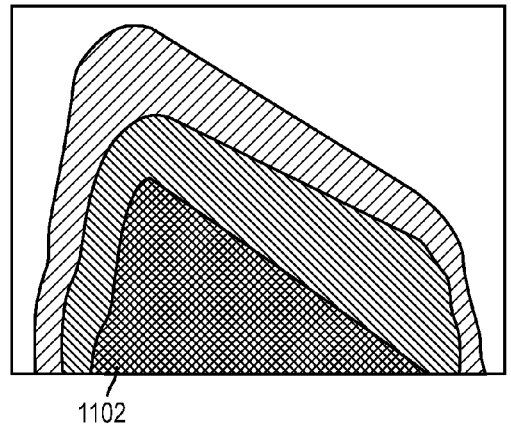
FIG. 11 is a depiction of a vertical weather profile including blended weather cells associated with the weather illustrated in FIG. 10 in accordance with an exemplary embodiment.
Figure 12:
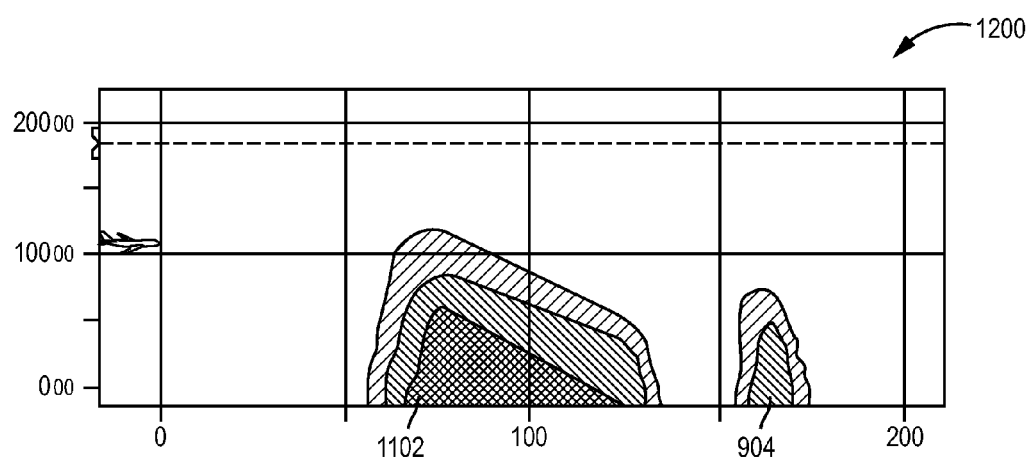
FIG. 12 is a depiction of a vertical weather profile provided by the system illustrated in FIG. 1 in accordance with an exemplary embodiment.

With reference to FIG. 11, the spaces between the reflectivity levels are filled to provide an image of weather 1102. With reference to FIG. 12, a vertical situation display 1200 includes weather 1102 and weather 904. Weather 904 is unchanged because it is not within a distance from weather 602.

Generally, XM data includes echo tops defined at levels of 18 dBz which is the level represented by the green color in avionic display (e.g., a range of 18 to 30 dBz). Other echo tops can be identified for levels of 30 to 40 dBz (a range associated with a yellow color in avionic displays and a range above 40 dBz, a range associated with a red color in avionic displays). The tops of reflectivity levels can be estimated using the data in FIG. 2 or Zipser curves.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of displaying weather for an aircraft using an avionic weather radar system, the method comprising:
providing a radar signal via a radar antenna of the avionic weather radar system;
receiving weather radar returns associated with the radar signal;
receiving onboard weather data derived from the weather radar returns of the weather radar system of the aircraft;
receiving external weather data from an external source, the external source being remote from the aircraft via an electronic communications unit; and
providing a vertical weather profile of the weather on an electronic display based on the onboard weather data and the external weather data from the external source, wherein the electronic display provides a first portion associated with a first range closest to the aircraft, a second portion associated with a second range, and a third portion associated with a third range farthest from the aircraft, the second range being between the first range and the third range, wherein first images of the weather in the first range are provided on the first portion in response to the onboard weather data without the external weather data, wherein third images of the weather in the third range are provided on the third portion in response to the external weather data without the onboard weather data, wherein second images of the weather in the second range are provided on the second portion in response to the onboard weather data and the external weather data, wherein the second images are provided by determining if a first weather cell in the second range in the onboard weather data is within a predetermined distance of a second weather cell in the second range in the external weather data, and if so, filling between display representations of the first weather cell and the second weather cell in response to altitude values and reflectivity values of the first weather cell and the second weather cell and if not, providing the representations of the first weather cell and the second weather cell without filling.

2. The method of claim 1, wherein the vertical profile is a two dimensional view along a flight path of the aircraft.

3. The method of claim 1, wherein the vertical profile is a two dimensional view along a selected azimuth direction from the aircraft.

4. The method of claim 1, wherein the second images are provided in the second portion using a blending process.

5. The method of claim 4, wherein the blending process uses the NEX RAD data associated with the external weather data and Echo Tops data associated with the external weather data.

6. The method of claim 4, wherein the blending process determines maximum altitude values and fills between the display representations of the first weather cell and the second weather cell using the maximum altitude values.

7. The method of claim 1, wherein the first range is up to 80 nautical miles (nm), the second range is from 80 nm up to 120 nm, and the third range is more than 120 nm.

8. A method of displaying weather data relating to weather for an aircraft, the method comprising:
   providing a radar signal via a radar antenna of an avionic weather radar system;
   receiving weather radar returns associated with the radar signal;
   receiving onboard weather data derived from the radar returns of the weather radar system of the aircraft;
   receiving external weather data from an external source, the external source being remote from the aircraft via an electronic communications unit; and
   providing a vertical weather profile of the weather on an electronic display based on the onboard weather data and the external weather data from the external source, wherein the electronic display provides a first portion associated with a first range closest to the aircraft, a second portion associated with a second range, and a third portion associated with a third range farthest from the aircraft, the second range being between the first range and the third range, wherein first images of the weather in the first range are provided on the first portion in response to the onboard weather data, wherein third images of the weather in the third range are provided on the third portion in response to the external weather data, wherein second images of the weather in the second range are provided on the second portion in response to the onboard weather data and the external weather data, wherein a blending process determines whether adjacent weather cells exist in the external weather data and the onboard weather data, and if not superimposes weather images from the external weather data and the onboard weather data to provide the second images in the second portion and if not the blending process blends the adjacent weather cells together by: a) determining the maximum altitudes for each reflectivity level in the adjacent cells, b) connecting points of the maximum altitudes of each reflectivity levels, and c) filling a required color to represent a desired reflectivity level to blend the adjacent weather cells for the second weather images in the second portion.

9. The method of claim 8, wherein the external weather data includes echo top data and NEXRAD reflectivity data, and the method provides a three dimensional model of the weather in the second range and the third range using the echo top data and NEXRAD reflectivity data.

10. The method of claim 9, wherein the weather model uses Zipser curves.

11. An avionic weather warning system, comprising:
   an electronic display;
   an electronic processor configured to:
     provide a three-dimensional weather profile of weather near an aircraft in response to onboard weather data from radar returns of a weather radar system of the aircraft and external weather data from an external source; and
   provide a two dimensional vertical weather profile on the electronic display in response to the onboard weather data from the radar returns of the weather radar system of the aircraft and the external weather data from the external source, wherein the electronic display provides a first portion associated with a first range closest to the aircraft and a second portion associated with a second range farthest from the aircraft, wherein first images of the weather in the first range are provided on the first portion in response to the onboard weather data, wherein second images of the weather in the second range are provided on the second portion in response to the external weather data, wherein a third range between the first range and the second range is associated with a third portion of the electronic display, wherein third images for the third portion are provided by determining if a first weather cell in the third range in the onboard weather data is within a distance of a second weather cell in the third range in the external weather data, and if so, filling between display representations of the first weather cell and the second weather cell in response to altitude values and reflectivity values of the first weather cell and the second weather cell.

12. The system of claim 11, wherein the electronic processor is further configured to:
   provide the third images as a blended image on the third portion as a blended portion of the display between the first portion and the second portion.

13. The system of claim 12, wherein the blended image are provided on the blended portion in response to the onboard weather data and the external weather data, the onboard weather data being first reflectivity data and the external weather data being second reflectivity data.

14. The system of claim 13, wherein the blended image includes non-adjacent weather cells from the first reflectivity data and the second reflectivity data.

15. The system of claim 14, wherein the blended image includes a blended cell associated with a first adjacent weather cell in the first reflectivity data and a second adjacent weather cell in the second reflectivity data.

16. The system of claim 15 wherein the blended image is formed by: a) determining the maximum altitudes for each reflectivity level in the first adjacent cell and the second adjacent cell, b) connecting points of the maximum altitudes of each reflectivity level, and c) filling a required color to represent a desired reflectivity level.

17. The system of claim 16, wherein second reflectivity data includes echo top data and NEXRAD reflectivity data.

18. The system of claim 11, wherein the first range is up to 80 nautical miles (nm), the third range is from 80 nm to 120 nm, and the second range is more than 120 nm.

19. One or more computer-readable non-transitory storage media having instructions stored thereon, the instructions being executable by one or more processors to execute a method on an aircraft comprising:
receiving onboard weather data derived from radar returns of a weather radar system of the aircraft;
receiving external weather data from an external source, the external source being remote from the aircraft; and
providing a vertical weather profile of the weather on a display based on the onboard weather data and the external weather data from the external source, wherein the display includes a first portion associated with a first range closest to the aircraft and a second portion associated with a second range farthest from the aircraft, wherein first images of the weather in the first range are provided on the first portion in response to the onboard weather data, wherein second images of the weather in the second range are provided on the second portion in response to the external weather data, wherein a third range between the first range and the second range is associated with a third portion, wherein third images for the third portion are provided on the display by determining if a first weather cell in the third range in the onboard weather data is within a distance of a second weather cell in the third range in the external weather data, and if so, filling between display representations of the first weather cell and the second weather cell in response to altitude values and reflectivity values of the first weather cell and the second weather cell.

20. The one or more computer-readable storage media of claim 19, wherein the filling provides a blended image in the third portion, and if the first weather cell and the second weather cell are not within the distance, providing the representations of the first weather cell and the second weather cell without filling.

* * * * *